UNITED STATES PATENT OFFICE.

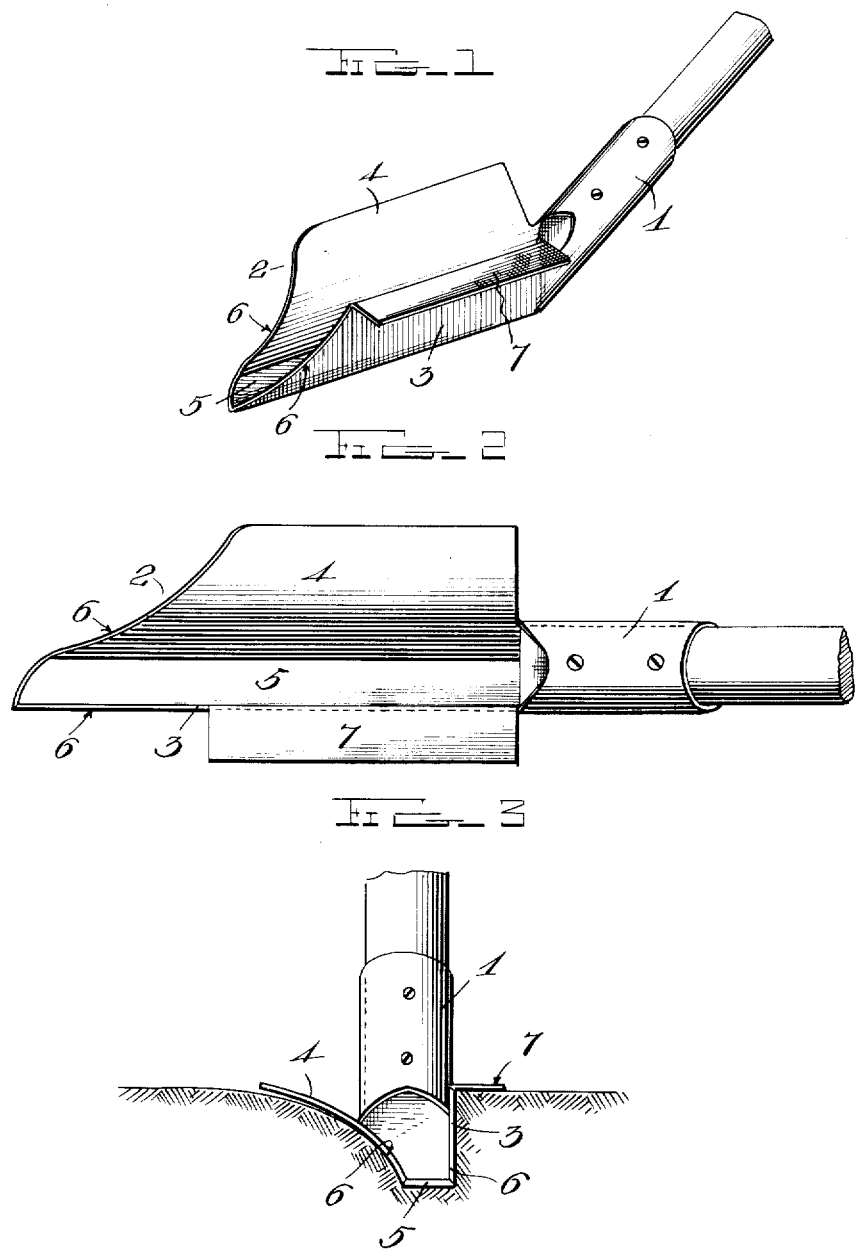

DWIGHT H. FINCH, OF MANCHESTER, IOWA.

LAWN-TRIMMING IMPLEMENT.

No. 902,141.  Specification of Letters Patent.  Patented Oct. 27, 1908.

Application filed March 2, 1908. Serial No. 418,783.

*To all whom it may concern:*

Be it known that I, DWIGHT H. FINCH, a citizen of the United States, residing at Manchester, in the county of Delaware and State of Iowa, have invented certain new and useful Improvements in Lawn-Trimming Implements; and I do declare the following to be a full, clear, and exact description of the invention, such as will enable others skilled in the art to which it appertains to make and use the same.

This invention relates to new and useful improvements in lawn trimming implements and has for its principal object the production of a simple device of this kind which may be advantageously employed for cutting the edges of lawns contiguous to side walks and the like, where it would be desirable to give a neater and more finished appearance to the lawn.

A further object of the invention is to provide a device which may be used with great advantage in laying out flower beds, parks or the like.

With the foregoing and other objects in view which will appear as the nature of the invention is better understood, the same resides in the novel features of construction, combination and arrangement of parts, illustrated in the drawings and particularly pointed out in the appended claims.

In the accompanying drawings:—Figure 1 is a perspective view of a device constructed in accordance with the invention;
Fig. 2 is a plan view thereof; and Fig. 3 is a front perspective view showing the device in position for use.

As shown in the drawings, the device is preferably constructed from a single piece of sheet metal or other suitable material bent to form a handle receiving or socket member 1, and a head 2.

In practice, the material of which the device is constructed is bent to form a vertical or perpendicular side 3 and an obliquely disposed outwardly curved side 4, said side members being connected by a bottom piece 5, the front end of said piece extending to a point some little distance in advance of the body portions of the sides 3 and 4, respectively, and constituting a cutting point for cutting into the ground. The side members are formed with inwardly curved sharpened cutting edges 6 which extend from the front end of the bottom strip or piece 5 to the body portions of the sides. By providing sharpened cutting edges as shown at the front ends of the sides the resistance offered to the passage of the implement through the earth is reduced to a minimum.

A particular feature of the invention resides in making one side of the device of sloping or outwardly curved formation, as when the implement is used for cutting the edges of lawns or the like contiguous to side walks or for garden purposes, one wall or side of the furrow is of sloping formation and will not be so easily broken off by pedestrians stepping on the new made furrow. An outwardly extending flange 7 is formed at the upper side edge of the vertical or perpendicular side 3 to form a guide or rest for the device, and as shown in Fig. 3 travels along the surface of the ground, this flange controls the depth of furrow which a device may cut and it is only necessary for the operator to keep the angle formed by the side 3 and flange 7 against the edge of the side to produce a furrow of even depth and width.

From the foregoing description, taken in connection with the drawings, the construction and operation of the invention will be readily understood without requiring a more extended explanation.

Having described my invention, what I claim as new and desire to secure by Letters-Patent is:—

A device of the character specified made from a single piece of metal bent to form a handle receiving member and a head, the latter comprising a vertical and an obliquely disposed outwardly curved side piece or member connected by a bottom strip, the former of the side pieces or members being bent outwardly at its upper edge to form an outwardly extending guide flange, the bottom strip extending to a point in advance of the guide flange and the side pieces having front inwardly curved sharpened cutting edges.

In testimony whereof I have hereunto set my hand in presence of two subscribing witnesses.

DWIGHT H. FINCH.

Witnesses:
  JAY W. LEWIS,
  D. R. LEWIS.